Dec. 8, 1936. E. F. ZAPARKA 2,063,216

RESILIENT CONNECTION

Original Filed Nov. 30, 1932   3 Sheets-Sheet 1

Inventor
EDWARD F. ZAPARKA

By Semmes & Semmes
Attorneys

Dec. 8, 1936.  E. F. ZAPARKA  2,063,216

RESILIENT CONNECTION

Original Filed Nov. 30, 1932   3 Sheets-Sheet 2

Inventor
EDWARD F. ZAPARKA
By Semmes & Semmes
Attorneys

Dec. 8, 1936.  E. F. ZAPARKA  2,063,216

RESILIENT CONNECTION

Original Filed Nov. 30, 1932  3 Sheets-Sheet 3

Inventor
EDWARD F. ZAPARKA

By Semmes & Semmes
Attorneys

Patented Dec. 8, 1936

2,063,216

UNITED STATES PATENT OFFICE 2,063,216

RESILIENT CONNECTION

Edward F. Zaparka, Baltimore, Md., assignor to Federal Spring Company, Coraopolis, Pa., a corporation of Pennsylvania Application November 30, 1932, Serial No. 645,106
Renewed April 28, 1936

14 Claims. (Cl. 267—30)

My invention relates to resilient supports, and has particular utility in connection with spring shackle constructions and mountings for motors, as well as other uses which will be readily apparent.

Heretofore, where shackles for springs such, for instance, as for springs which support vehicles, have been employed, it has been necessary to have the connection between the vehicle and the spring, at least one end of the spring, made through a link which is pivoted both to the spring and to some point on the vehicle. This has been necessary by reason of the elongation or contraction of the spring under varying loads. The double points of pivoting for at least one of the spring shackles was necessary to take care of this change in effective length of the spring support. Sometimes, there has been employed rubber supporting members which have eliminated the necessity of the double pivot of the usual spring shackle. Such rubber connections gave a support which in its functioning permitted movement in all directions, and this was a disadvantage not only in spring connections for vehicles, since transverse movement of the vehicle frame on the spring mounting interfered with the steering. This multi-directional movement was also a disadvantage in resilient mountings for motors where play in all directions of the motor on its base is undesirable.

Various constructions for limiting the flexibility of the resilient support in some undesirable directions of motion have been tried, but the constructions were expensive and relatively inefficient.

These and other disadvantages in the prior art will be apparent from the ensuing description.

An object of my invention is to provide a supporting member which is resilient and which will permit of transverse movement between the load and the support for the load in two directions, but which will be relatively stiff in directions at an angle to the desired directions.

Another object of my invention is to provide a resilient supporting member which in spring systems will furnish a source of vibrations of different periodicity from that of the system proper, and which will thus tend to damp the vibrations imparted to the load.

Another object of my invention is to provide a system of supports so arranged that one of the supports will permit a mere bending, whereas the other support will permit not only bending, but also a transverse displacement of one end of the support with respect to the other, the two ends of the support moving in opposite directions in substantially parallel planes. Another object is to prevent shimmying by introducing into the spring system a shackle having a period of vibration differing from that of the spring.

A further object of my invention is to provide supports with which rubber-like material may be incorporated with consequent saving in weight of metal, while at the same time lightening the metallic structure and achieving superior results in resilience and strength.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions, which, for the purpose of explanation, have been the subject of illustration.

Figure 1:
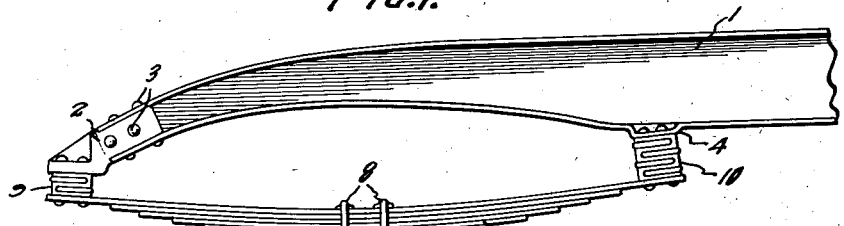
Figure 1 is a side elevation of a portion of a vehicle frame to which is applied an elliptical spring suspension incorporating my spring shackle construction.

Referring to the drawings, I have shown in Figure 1 an ordinary spring suspension, such as is adapted for the front of an automobile chassis. The numeral 1 designates the side frame of the car, which is provided at its forward end with a downwardly projecting spring pad 2, riveted at 3 to the front of the frame 1. The frame 1 is provided also with a spring pad 4 to which the rear shackle is adapted to be attached. The axle of the car is indicated by the numeral 5, and supported on the axle, on a spring pad 6, is the usual multi-leaf spring construction 7 which is held by U-bolts 8 to the spring pad 6 of the axle 5. The spring 7 supports the nose of the frame 1 through a front spring shackle 9 and the other end of the spring 7 supports the frame 1 through a rear spring shackle 10. The details of the front and rear spring shackles are apparent from an inspection of Figures 2 and 3, respectively.

Figure 2:
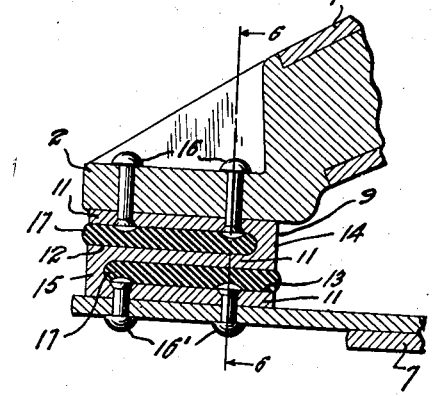
Figure 2 is a detail view partly in section, showing the front shackle arrangement.

Referring to Figure 2, particularly, it will be seen that the front shackle 9 is formed by cutting slots in a block of resilient metal which may be spring steel or any other desired resilient metal, or even other material which has the requisite strength and resiliency. The spring shackle 9 comprises a series 11 of segments formed by the cuts made at 12 and 13 in the body of the metal. You will notice that the cut 12 extends in one direction through the block of metal which forms the spring shackle 9, and leaves between the upper segment 11 and the middle segment 11 a union link 14. The lower cut 13 is made in the opposite direction through the body of the metal and leaves a union link 15, which is of substantially uniform cross-section, as is union link 14. The cuts 12 and 13 being made in opposite directions, permit the upper segment 11 to move with respect to the lower segment 11 with a bending motion. The upper segment 11 is fastened by bolts or rivets 16 to the spring pad 2, and the lower section 11 is fastened by the bolts or rivets 17 to the uppermost and longest spring element of the multi-leaf spring construction 7.

It is important to notice that by reason of the location of the union links there can be a bending motion of the upper segment 11 with respect to the lower segment 11, but the construction is stiff and relatively unbendable except in a plane substantially perpendicular to the roadbed and parallel to the longitudinal axis of the car. Another way of stating this would be to say that the construction is flexible to forces acting in the plane of the paper on which the drawing appears, but not in other planes. Any tending to flexion in directions other than that copied by the plane of the paper on which the drawing is made is resisted by reason of the construction of the device.

This front shackle permits bending, but does not permit lateral displacement in the sense of off-setting to take place between the upper and lower segments. This is very desirable in the front shackle. The two cuts indicated, since they give but one segment with free motion, are insufficient to permit off-setting between the upper and lower segments. As will be explained in connection with the rear shackle, because of the number of cuts in the metal body of the shackle exceeds two, there can be not only a bending movement, but also a relative shifting or off-setting between the ends of the shackle, so that the ends of the shackle may travel in directions substantially parallel to each other.

Between the segments of the shackle, I have inserted a rubber-like material which preferably is caused to adhere to the opposed faces of the segments. This rubber material I designate by the numeral 17. Because the rubber adheres to the opposed surfaces of the segments, it adds not only to the resiliency in compression, but also in movements of the shackle which tend to separate the substantially parallel faces of the segments.

Figure 3:
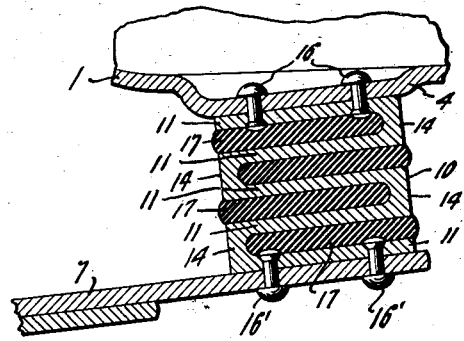
Figure 3 is a detail view partly in section, showing the rear shackle arrangement.

Now referring to Figure 3, which shows the rear shackle 10 in detail, this is formed preferably of a single metallic mass which may be of rectangular configuration, as is the front shackle. There are a series of cuts in opposite directions passing through the body of the shackle 10, giving a series of slots similar to those which exist in the front shackle, but it is to be noted that there are a number of segments 11 greater than is the case with the front shackle. We have in this construction five segments 11, and four cuts. The cuts, as is the case with the front shackle, are filled with rubber-like material 17 which adheres to the opposed faces of the segments. The upper segment 11 of the rear shackle is secured by rivets 16 to the spring pad 4, and the lower segment 11 of the shackle is secured by rivets 19 to the upper face of the longest leaf of the spring 7.

Figure 4:
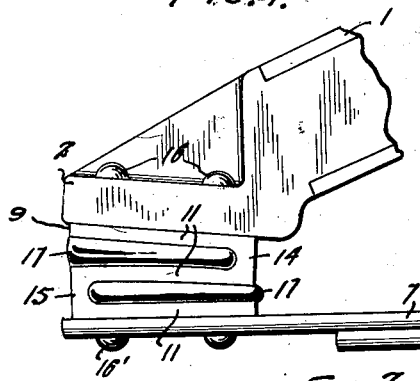
Figure 4 is a detail view showing the position of the parts of the front shackle on receipt of an impact by the elliptical spring tending to straighten it.
Figure 5:
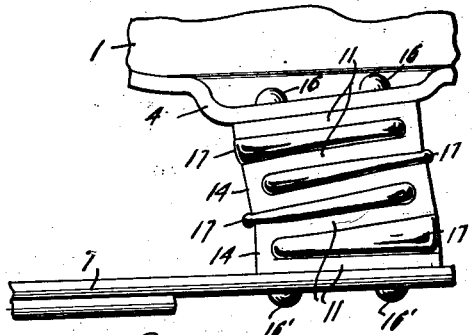
Figure 5 is a detail view showing the position of the parts of the rear shackle upon receipt by the elliptical spring of an impact tending to straighten it.
Figure 6:
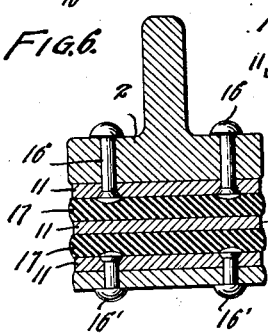
Figure 6 is a sectional view taken along the line 6—6 of Figure 2.

The action of the shackles when an impact causes the axle 5 to be raised relative to its position shown in Figure 1, to flex the spring 7 and cause it to straighten out from its shape as shown in Figure 1, is apparent from an inspection of Figures 4 and 5.

Figure 4 is a detail view showing the action of the front spring shackle when the spring 7 is compressed. It will be noted that the upper segment 11 is displaced with relation to the lower segment 11, but there has been no parallel or off-setting movement between these two segments other than the bending movement above referred to. The lower rubber filler 17 is compressed at its outer end and the upper rubber filler 17 has been stretched at its outer end. The middle segment 11 has been bent.

Now referring to Figure 5, we will see that the outer edge of the lowest rubber filler has been stretched. The next pad above it has its outer end compressed. The next pad above it, i. e. the third from the bottom, has its outer end compressed, and the last pad on the top has had its outer end stretched. The three segments 11 intermediate the lowermost segment and the topmost segment have been bent as indicated. It is to be noted that in this position of the spring suspension 7, the top of the spring has moved to the right from its position shown in Figures 1 and 3, and, of course, has carried with it the lower segment 11 of the shackle. Thus, there has been not only a bending of the shackle 11, but there has been a relative off-setting displacement between the upper part of the shackle 11, which is fastened to the spring pad 4 on the frame, and the lower part of the shackle, which is fastened to the topmost spring of the multi-leaf spring 7.

As with the front shackle, however, by reason of the positioning of the cuts and the relationship of the segments and their union links in the rear shackle, no free movement has been permitted transverse to the longitudinal axis of the car. As before stated, this is desirable in many connections, and peculiarly in spring suspensions for cars, by reason of the necessity of such limitation of movement because of the operation of the steering connections.

This rear shackle construction has permitted the distance between the base of the front shackle and the base of the rear shackle to be increased, and therefore this shackle combination has accommodated itself to the increase in the length of the spring 7.

Figure 8:
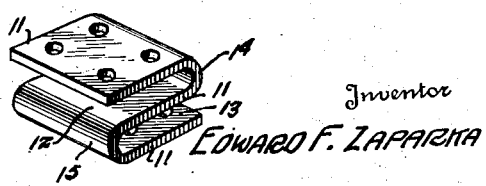
Figure 8 is a perspective view in detail showing a front shackle pressed from a single metallic stamping.

Figure 8 shows a detail of the front spring shackle which is stamped out of a single piece of material. This stamping operation can be so regulated as to insure that the grain of the metal shall lie in the position of greatest strength to give the maximum efficiency to both the bending action of the segments and the action of the union links, thus permitting great strength with relatively light weight.

Figure 9:
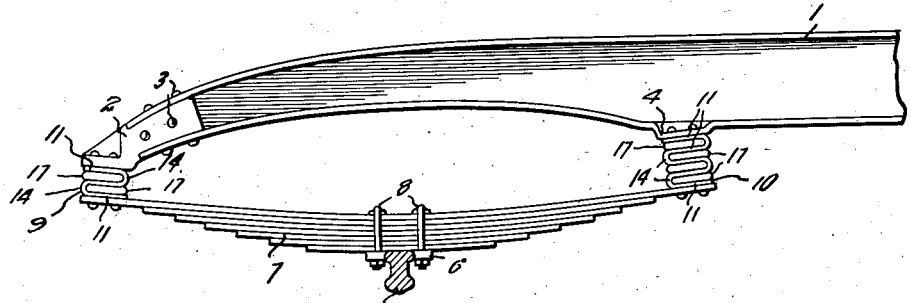
Figure 9 is a side elevation of a modification of the form of invention shown in Figure 1, in which the front and rear shackles are made from single metallic stampings.

Referring to Figure 9, I have shown my devices applied to the front wheel suspensions of an automobile chassis. This form of invention is similar to that shown in Figure 1, with the exception that the front shackle is similar in form to that shown in Figure 8, that is to say, the front shackle is bent up from a single stamping. Rubber-like filler 17 is inserted between the opposed faces of the segments. The front shackle has but one segment which is capable of free movement, namely the middle segment, the other two segments being attached to the spring pad 2 at the nose of the automobile chassis and to the top leaf of the spring 7, respectively.

The rear shackle is similar to that shown in Figure 1, with the exception that the rear shackle is formed from a single stamped strip bent to shape.

Figure 10:
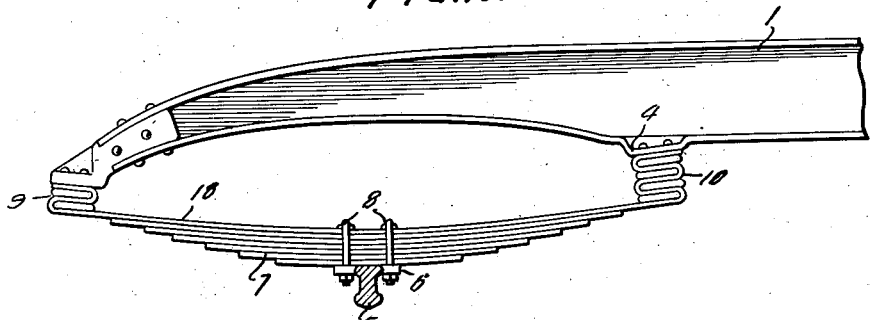
Figure 10 is a side elevation of a modification of the form shown in Figure 9, in which the shackles are formed integrally from the top leaf of the spring proper by bending it.

In Figure 10 I have shown a form of front and rear shackle for a front wheel spring suspension of an automobile in which the front shackle 9 is formed by bending up the upper leaf 18 of the spring 7, and forming the front shackle 9 from the bent upper leaf 18 of the spring 7. The rear shackle 10 is similar in form to that shown in Figure 9, with the exception that the rear shackle 10 is also formed by bending the upper leaf 18 of the spring 7 into the shackle. This construction of the front and rear shackles being stamped out, or pressed out, of the upper leaf of the spring proper is very sturdy and simple to construct. There are a minimum of parts, and the operation of assembly of the shackles on the spring is simplified.

Figure 11:
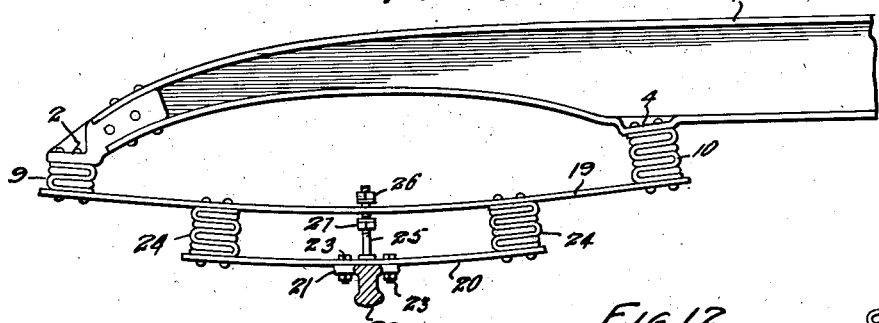
Figure 11 is a side elevation of an application of my spring shackle to the form of spring suspension which I have heretofore devised.

Referring to Figure 11, I have shown a form of spring suspension such as that shown and fully described in my application Serial No. 638,815, filed October 20, 1932, entitled "Resilient suspensions". Briefly, the system of supension comprises an upper spring 19 and a lower spring 20, the lower spring 20 being held on a spring pad 21 carried by an axle 22. The lower spring 20 is held on the spring pad 21 by means of bolts 23. Shackle, or supporting members, 24 are held by rivets to the ends of the short spring 20. These may be of any desired form.

In Figure 11 I have shown them of the form pressed from a strip of metal, such as is illustrated in Figures 8 and 9. The shackle members 24 are shown with a plurality of freely moving segment members, and may be exactly similar in construction to the rear shackle member 10, shown in Figure 9. Mounted on the shackle members 25 is the longer spring member 19, which is held on the shackle members by means of rivets. The longer spring 19 carries a front shackle member 9 which may be exactly similar to the front shackle member 9 of Figure 9, and a rear shackle member 10 which may be exactly similar to the rear shackle member 10 of Figure 9.

A stop support 25 is carried by the axle, and an adjustable upper stop member 26 and an adjustable lower stop member 27 are carried by the stop support 26. These stops 26 and 27 may be adjusted to limit the free movement of the center of the spring 19 either in its upward or downward movement. As fully explained in my copending application referred to, Serial No. 638,-815, this spring suspension system permits reduction in weight while greatly adding to the dampening of the impact blows and to the ease in riding of the vehicle.

The shackle members 25, 9 and 10 in this system have been found of great value since, as before explained, these shackle members permit movement in two directions only, and forces acting on the shackles at an angle to these two directions are resisted by reason of the shackle construction, thus giving the desired flexibility in a plane substantially perpendicular to the roadbed, but resisting movement in other planes, particularly in planes substantially parallel to the roadbed. There can be controlled movement to the front and rear; sideways movement is largely eliminated.

This shackle assembly with the spring system just described in connection with Figure 11 is also of peculiar utility in that the shackles themselves introduce periods of vibration which differ from that of the spring 19, or of the spring 20, in any of their various positions, and these superimposed non-synchronous vibrations in the assembly shown in Figure 11 tend to damp each other.

Figure 12:
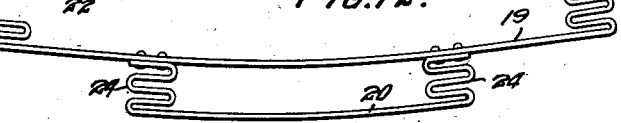
Figure 12 is a side elevation of a modification of the form of invention shown in Figure 11, in which all of the shackles are integrally formed from the body of the springs themselves.

In Figure 12 I have diagrammatically shown a spring suspension system similar to that shown in Figure 11, but have shown the shackles 24 uniting the short spring 20 and the long spring 19 as struck up from the body of the leaf 20 itself. Of course rubber-like filler material may be introduced between the segments in these shackles 24, and such material preferably is made to adhere to the opposed faces of the surfaces. The upper spring 19 has its front shackle 9 formed as in the modification shown in Figure 10, and its rear shackle 10 formed as shown in Figure 10, and here also rubber-like filler material adhering to the opposed faces of the segments may be inserted in the interstices, or slots of the shackle.

Figures 13, 14:
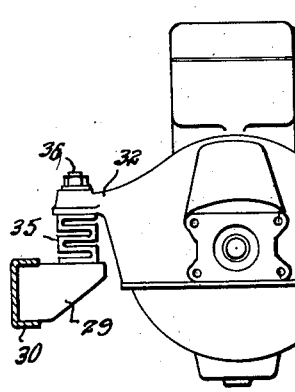
Figure 13 is an end view of a gasoline motor mounted on my type of supporting devices.
Figure 14 is a detail view in section of the supporting device shown at the right-hand of Figure 13.
Figure 15:
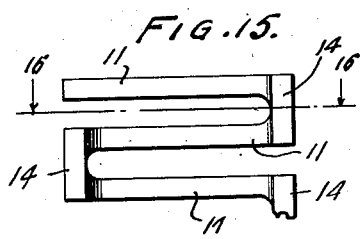
Fig. 15 is a fragmentary view in side elevation of one form of my force transmitting device cut from a single mass of material, and in which the segments are weakened by having their sides cut away.

In Figures 13 and 14 I have shown my forms of force transmitting devices as applied to the resilient suspension of a gasoline engine, such as may be used in an automobile. It is apparent that these forms of devices may be used in other connections where a resilient suspension may be desirable.

Figure 7:
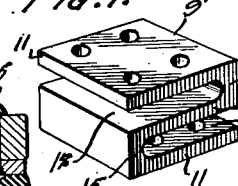
Figure 7 is a perspective view in detail showing the front shackle cut from a single mass of metal.

Referring to Figure 13, I have shown a gasoline engine 28 adapted to be mounted on supports 29 attached to the side frames 30 of an automobile. The crankcase of the engine is provided with a support leg 31 on the right and a support leg 32 on the left. The support leg 31 engages the upper segment of one of my shackle members 33 formed as is shown in Figure 7. This is the typical so-called front shackle member, that is to say, it has but one freely moving segment and is capable of bending motion, but the upper and lower segments may not have an offsetting motion. A bolt 34 holds the leg 31 to the upper segment of the resilient force transmitting device 33. The lower segment of this device is suitably attached, in a manner to be described, to the support 29.

On the left of the drawings, Figure 13, there is shown a force transmitting device 35 similar in construction to the rear shackle member shown in Figure 1, and in detail in Figure 3. This type of support or force transmitting member permits the upper and lower segments thereof to have motions similar to those shown and described in connection with Figure 5. Of course rubber-like filler could be inserted between the segments of these support members, and they might be of the type stamped from a single blank, though for the purpose of simplicity in description the various modifications are not shown. The force transmitting device 35 is suitably fastened, in a manner to be described, to support 29 at the bottom, and has its upper segment bolted at 36 to the leg 29.

Referring to Figure 14, I have illustrated in detail the construction of the force transmitting device 33, and its method of attachment to the support 29 and to the engine leg 31. A similar construction may be used in connection with force transmitting device 35 which has the larger number of free moving segments.

In Figure 14 I have shown the force transmitting device 33 having its lower segment formed with a bolt 37 which may be integrally cut from the same block of material from which the force transmitting device 33 is formed. This bolt 37 is provided with screw-threads 38, and is adapted to project through an aperture 39 in the support 29. A nut 40 is screwed down against a washer 41 to hold the lower segment of the member 33 tightly clamped against the upper surface of the support 29. The upper segment of the device 33 is formed with a longer bolt 42 which may be integrally cut from the same block of material from which the device 33 is formed. The longer bolt 42 fits through an aperture 43 in the structure of the motor leg 31. At the top of the bolt 42 there are screw-threads 44, and a nut 45 is adapted to be screwed down to hold a washer 46 tightly against the upper surface of the motor leg structure 31. Thus the upper segment of the device 33 is tightly held against the lower surface of the motor leg 31.

The effect of my resilient shackles in a spring suspension for a car is to prevent to a large extent the phenomenon known as shimmying or tramping. The reason for this is that the periods of vibration of the shackles are different from that of the spring system proper, and the mutual reactance of these vibrations tend to oppose each other and produce a definite dampening effect.

It will be noted that in the drawings I have shown the union links formed with a rounded inner face. A square inner face to the union links does not give as great strength and resistance to bending forces as the union link with the rounded inner face. Where the material is cut from a solid metal mass, the bottom of the cut, therefore, is made rounded to form the rounded inner face of the union link. In all such forms cut from a single metallic mass, there is a considerable mass of stiff metal in the union link, and this tends to concentrate the reaction to the bending forces in the segments themselves.

In the drawings. Figures 15 to 20 inclusive, I have shown forms of my device wherein this concentration of the reaction to the bending forces in the segments themselves is achieved to a greater degree than in the other forms shown.

Figure 16:
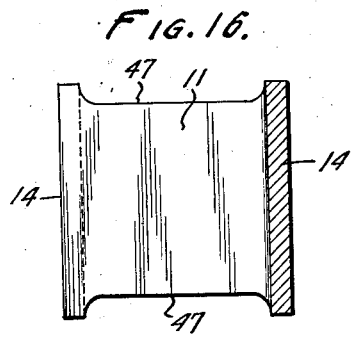
Fig. 16 is a view taken on the line 16—16 of Figure 15, looking in the direction of the arrows.

Referring to Figure 16, I have shown a form of device made from a single metallic mass by cutting slots to form the segments and union pieces. It is to be noted that the segments 11, as clearly shown in Figure 16, have cut away portions 47 which weaken the segments and make them relatively weak to bending forces in comparison to the union links 14. This construction tends to concentrate the reaction to the bending forces largely in the segments themselves, rather than in the union pieces.

Figure 17:
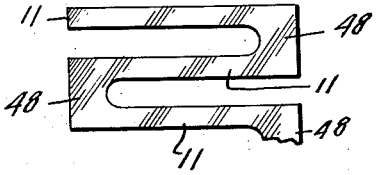
Fig. 17 is a fragmentary view in side elevation of a form of my device in which the union links are shown massive and thick to insure stiffness therein.

In Figure 17 I have shown a form of device in which the segments are not cut away, but in which the union pieces 48 are relatively stiff and massive. In the form shown the union pieces are made by cutting slots with rounded bottoms in the metallic mass from which the device is made. The slots are not cut as close to the outer edge of the union links as, for instance, in the form shown in Figure 15, which leaves the union links relatively stiff and unbendable in comparison to the segments. This form therefore concentrates the reaction to the bending forces largely in the segments themselves.

Figure 18:
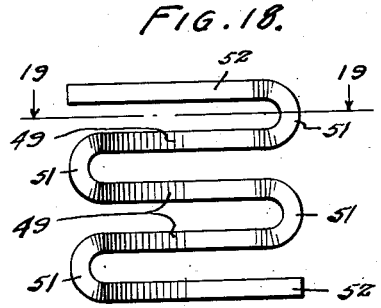
Fig. 18 is a view in side elevation of a form of pressed metal construction in which the segments have cut-away sides.

In Figure 18 I have shown a pressed metal form composed of segments 49 and union links 51. The segments 49 are formed with cut away sides, as clearly indicated in Figure 19, which tends to make the segments more bendable than the union links and to concentrate the reaction to bending forces in the segments.

Figure 19:
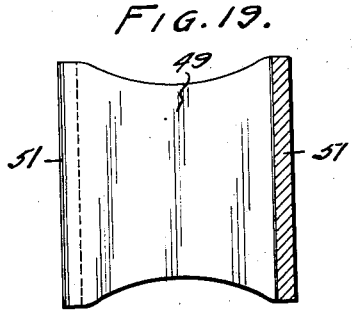
Fig. 19 is a view taken along the line 19—19 of Figure 18, looking in the direction of the arrows.
Figure 20:
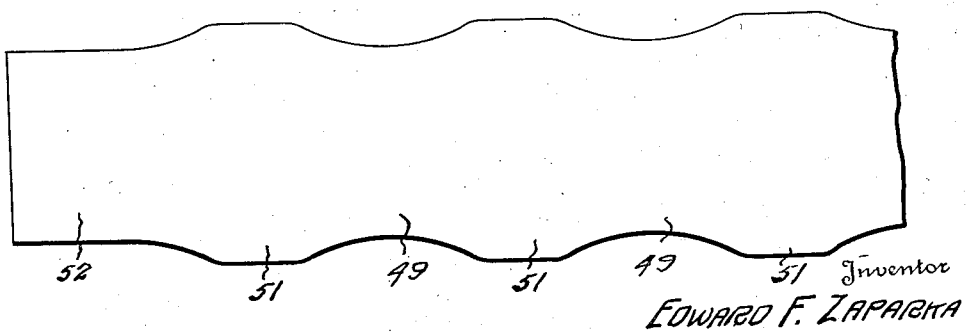
Fig. 20 is a fragmentary top plan view of the blank from which the form shown in Figure 18 is bent.

In Figure 20 there is shown a blank from which the form of device illustrated in Figures 18 and 19 is made. The segments are indicated at 49, and their cut-away portions are readily apparent. The union links 51 are shown as of constant width. The blank illustrated in Figure 20 has a portion broken away. It is to be noted that the end segment, which I designate by the numeral 52, has not cut-away sides as it is adapted to be clamped, riveted or otherwise fastened to a support of a supported member.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a spring shackle arrangement for a vehicle, a load member, a spring to support the load member at a plurality of points, a supporting member comprising means between the spring and load member having spaced segments, only one of which is capable of free movement, oppositely disposed union links uniting said last mentioned segment at opposite ends to adjacent segments, and a second supporting member comprising means between the spring and load having spaced segments, more than one of which is capable of free movement, and oppositely disposed union links uniting adjacent segments.

2. In a mounting to support a load on a base, a supporting member between the load and base comprising spaced segments, only one of which is capable of free movement, oppositely disposed union links uniting said last mentioned segment at opposite ends to adjacent segments, and a second supporting member between the load and base comprising spaced segments, more than one of which is capable of free movement, and oppositely disposed union links uniting adjacent segments.

3. In a spring shackle arrangement for a vehicle, a load member, a spring to support the load member at a plurality of points, a supporting member integrally formed by cutting from a single metal mass forming means between the support and load having spaced segments, only one of which is capable of free movement, and oppositely disposed union links uniting said last mentioned segment at opposite ends to adjacent segments, and a second supporting member integrally formed by cutting from a metal mass comprising means between the spring and load having spaced segments, more than one of which is capable of free movement, and oppositely disposed union links uniting adjacent segments.

4. In a spring shackle arrangement for a vehicle, a load member, a spring to support the load member at a plurality of points, a supporting member comprising means between the support and load having spaced segments, only one of which is capable of free movement, rubber-like material between said segments, and oppositely disposed union links uniting said last mentioned segment at opposite ends to adjacent segments, and a second supporting member comprising means between the spring and load having spaced segments, more than one of which is capable of free movement, rubber-like material between said segments, and oppositely disposed union links uniting adjacent segments.

5. In a spring shackle arrangement for a vehicle, a load member, a spring to support the load member at a plurality of points, a supporting member comprising means between the support and load having spaced segments, only one of which is capable of free movement, rubber-like material between said segments and adhering to the opposed faces thereof, and oppositely disposed union links uniting said last mentioned segment at opposite ends to adjacent segments, and a second supporting member comprising means between the spring and load having spaced segments, more than one of which is capable of free movement, rubber-like material between said segments and adhering to the opposed faces thereof, and oppositely disposed union links uniting adjacent segments.

6. In a spring shackle arrangement for a vehicle, a load member, a spring to support the load member at a plurality of points, a supporting member integrally formed by cutting from a single metal mass forming means between the support and load having spaced segments, only one of which is capable of free movement, rubber-like material between said segments, and oppositely disposed union links uniting said last mentioned segment at opposite ends to adjacent segments, and a second supporting member integrally formed by cutting from a metal mass, comprising means between the spring and load having spaced segments, more than one of which is capable of free movement, rubber-like material between said segments, and oppositely disposed union links uniting adjacent segments.

7. In a spring shackle arrangement for a vehicle, a load member, a spring to support the load member at a plurality of points, a supporting member integrally formed by cutting from a single metal mass forming means between the support and load having spaced segments, only one of which is capable of free movement, rubber-like material between said segments and adhering to the opposed faces thereof, and oppositely disposed union links uniting said last mentioned segment at opposite ends to adjacent segments, and a second supporting member integrally formed by cutting from a metal mass, comprising means between the spring and load having spaced segments, more than one of which is capable of free movement, rubber-like material between said segments and adhering to the opposed faces thereof, and oppositely disposed union links uniting adjacent segments.

8. In a mounting to support a load on a base, a supporting member between the load and base comprising spaced segments, oppositely disposed union links uniting said segments at opposite ends to adjacent segments, a second supporting member between the load and base comprising spaced segments of a greater number than those in the first named supporting member, and oppositely disposed union links uniting adjacent segments in the second supporting member.

9. A force transmitting device to be used as a mounting and shackle element comprising spaced segments of relatively large breadth cut from the same metallic mass, more than one of which is capable of flexing movement, and oppositely disposed union links integrally formed with said segments and uniting adjacent segments, and a rubber-like filler material between adjacent segments and adhering to the opposed faces thereof and to the inner faces only of the union links.

10. A force transmitting device to be used as a mounting and shackle element comprising spaced segments relatively broad cut from the same metallic mass, more than one of which is capable of flexing movement, and oppositely disposed union links integrally formed with said segments and uniting adjacent segments, and a rubber-like filler material between adjacent segments and contacting the interior of the union links only, whereby flexure in two directions is easily effected while there is greater stiffness in other directions.

11. A force transmitting device to be used as a mounting and shackle element comprising spaced segments of relatively large breadth cut from the same metallic mass, only one of which is capable of flexing movement, and oppositely disposed union links integrally formed with said segments uniting said last mentioned segment at opposite ends to adjacent segments, and rubber-like filler material between the segments and adhering to the opposed faces thereof, the outer surface of the union links being free, and mounting means cooperating with the ensemble permitting ease of flexure in only two directions.

12. A force transmitting device to be used as a mounting and shackle element comprising resilient segments of relatively great breadth in respect to length, oppositely disposed union links of like breadth to that of the segments of substantially uniform cross section uniting the segments, said segments and links being formed by cutting a metallic mass so that the links and segments are integrally formed, and rubber-like filler adhering to adjacent surfaces of the segments and the interior only of the union links.

13. A force transmitting device to be used as a mounting and shackle element comprising resilient segments, said segments being relatively broad, oppositely disposed union links of substantially uniform cross section uniting the segments, and rubber-like filler between adjacent segments and adhering to the adjacent surfaces of the segments and the interior only of the union links.

14. A force transmitting device to be used as a mounting and shackle element comprising resilient segments, said segments being relatively broad, oppositely disposed union links uniting the segments, and a rubber-like filler between the segments adhering to the adjacent surfaces of the segments, and means for mounting the whole so that in combination with the link and segment construction there shall be relatively ease of flexure in two directions only, the rubber-like filler extending only to the side edges of the union links.

EDWARD F. ZAPARKA.